US009495530B2

(12) United States Patent
Dittrich (10) Patent No.: US 9,495,530 B2
(45) Date of Patent: *Nov. 15, 2016

(54) WIRELESS SECURITY CONFIGURATION

(75) Inventor: Wolfgang Dittrich, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,989

(22) Filed: Apr. 25, 2012

(65) Prior Publication Data

US 2013/0291074 A1 Oct. 31, 2013

(51) Int. Cl.
*G06F 21/36* (2013.01)
*G06F 21/44* (2013.01)
*H04W 12/04* (2009.01)
*H04W 12/08* (2009.01)
*H04W 84/12* (2009.01)

(52) U.S. Cl.
CPC ............... *G06F 21/36* (2013.01); *G06F 21/44* (2013.01); *H04W 12/04* (2013.01); *G06F 2221/2129* (2013.01); *H04W 12/08* (2013.01); *H04W 84/12* (2013.01)

(58) Field of Classification Search
CPC ... H04W 88/12; H04W 88/085; G06F 21/00; G06F 21/30; G06F 21/305; G06F 21/34; G06F 21/35; G06F 21/42; G06F 21/43; G06F 21/44; G06F 2221/2112; H04L 9/00; H04L 9/08; H04L 9/32; H04L 9/321; H04L 9/3226; H04L 9/3228; H04L 2209/80; H04L 63/00; H04L 63/06; H04L 63/067; H04L 63/08
See application file for complete search history.

(56) References Cited

U.S. PATENT DOCUMENTS

| 8,115,819 | B2* | 2/2012 | Anderson | 348/211.1 |
| 8,576,773 | B2* | 11/2013 | Pendakur | 370/328 |
| 9,171,344 | B2* | 10/2015 | Yu | G06Q 10/06 |
| 2005/0059385 | A1* | 3/2005 | Twigg et al. | 455/418 |
| 2005/0245235 | A1* | 11/2005 | Vesuna | H04L 63/08 455/411 |
| 2006/0117174 | A1* | 6/2006 | Lee | 713/154 |
| 2008/0231716 | A1* | 9/2008 | Anderson | 348/211.3 |
| 2009/0116066 | A1 | 5/2009 | Nishitani | |
| 2011/0145049 | A1* | 6/2011 | Hertel | G06Q 20/02 705/14.23 |

(Continued)

FOREIGN PATENT DOCUMENTS

EP  2 107 509       10/2009
EP  2 385 480 A1   11/2011

OTHER PUBLICATIONS

"Sun Netra CP3240 Switch User's Guide: Chapter 22" [Online], Sep. 9, 2009 [Retrieved on: Sep. 12, 2016], Sun Microsystems, Inc.,[Retrieved from: < https://docs.oracle.com/cd/E19859-01/820-3252-11/FP44ucgACL.html >].*

(Continued)

*Primary Examiner* — Eric W Shepperd
(74) *Attorney, Agent, or Firm* — Jones Day (57) ABSTRACT

An apparatus, method and computer-readable storage medium to efficiently connect to wireless access point(s). An electronic device may capture coded information. The coded information may include a security key to connect to a wireless access point, and the coded information may be an image, an audio clip, or a video. The coded information may be a Quick Response Code. The coded information may be captured from a display of a second electronic device. The second electronic device may include the wireless access point.

14 Claims, 5 Drawing Sheets

(56) References Cited

U.S. PATENT DOCUMENTS

| | | | |
|---|---|---|---|
| 2011/0150266 A1* | 6/2011 | Hohndel | 382/100 |
| 2011/0314299 A1* | 12/2011 | Lee | 713/189 |
| 2012/0233679 A1* | 9/2012 | Shedrinsky | 726/7 |
| 2012/0252405 A1* | 10/2012 | Lortz et al. | 455/410 |
| 2012/0284782 A1* | 11/2012 | Karim et al. | 726/6 |
| 2013/0195088 A1* | 8/2013 | Ho | H04W 52/0206 370/338 |
| 2013/0262687 A1* | 10/2013 | Avery et al. | 709/229 |

OTHER PUBLICATIONS

Steeman, Jeroen, "QR Code Generator—WiFi Access," Apr. 12, 2011, XP055083883, retrieved from the Internet: URL:http://web.archive.org/web/20110412141212/http://blog.qr4.nl/Qr-Code-WiFi.aspx (retrieved on Oct. 14, 2013), the whole document.
Extended European Search Report, dated Oct. 29, 2013, from corresponding EP application No. 13164331.4.
Decorating a QR Code—Part Two, Aug. 4, 2011, http://qrworld.wordpress.com/2011/08/04/decorating-a-qr-code, 6 pages.
Office Action dated Aug. 8, 2014 in EP No. 13164331.4.

\* cited by examiner

WIRELESS SECURITY CONFIGURATION

BACKGROUND

Using an electronic device (e.g., a mobile device) to wirelessly access a network such as the Internet usually entails connecting the device to a wireless access point (WAP) which is in turn connected to the network. To prevent unauthorized devices from connecting to the WAP, the WAP may be password protected. Specifically, the device attempting to connect to the WAP may have to supply a valid security key to connect to the WAP. Traditionally, a user utilizes the device attempting to connect to the WAP to scan for available WAPs in the vicinity and selects a particular WAP to connect to. The device may then prompt the user to enter the security key for that WAP. If the user enters the correct security key, the device may then connect to the WAP to attain access to the corresponding network.

This traditional approach is problematic since the user has to either 1) type in the security key manually, or 2) copy the key onto an Universal Serial Bus (USB) drive and plug the USB drive into a USB port of the device attempting to connect to the WAP. Given that current security protocols such as Wi-Fi Protected Access (WPA) require long security keys, typing in the security key manually is cumbersome and error prone. Using an USB drive can be problematic since the device may not have a USB port and/or users may not have easy access to a USB drive.

DETAILED DESCRIPTION

Embodiments may be discussed in systems to efficiently connect to wireless access point(s). An electronic device may capture coded information. The coded information may include a security key to connect to a wireless access point, and the coded information may be an image, an audio clip, or a video. In an embodiment, the coded information may be a Quick Response Code. In an embodiment, the coded information may be captured from a display of a second electronic device. In an embodiment, the second electronic device may include the wireless access point. In an embodiment, the coded information may be an image and the coded information may be captured from a configuration sheet. In an embodiment, the wireless access point may be secured by one of Wi-Fi Protected Access, Wi-Fi Protected Access II, and Wired Equivalent Privacy. In an embodiment, the coded information may include an identifier identifying the wireless access point.

In an embodiment, an electronic device may code information including a security key. The security key may be required to connect to a wireless access point and the coded information may be an image, an audio clip, or a video. The electronic device may display the coded information on a display of the electronic device.

Figure 1:
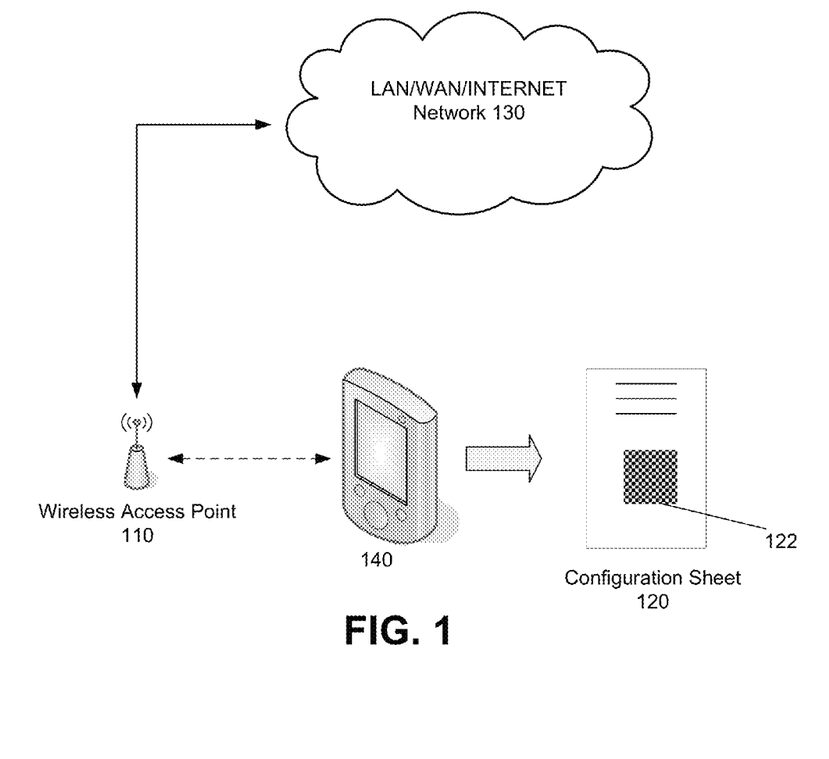
FIG. 1 illustrates a device connected to a WAP according to an embodiment.

FIG. 1 illustrates a device connected to a WAP according to an embodiment. A wireless access point (WAP) 110 may be connected to a network 130 such as a wide area network (WAN), a local area network (LAN), or the Internet. A device 140 may connect to the WAP 110 to access the network 130. Typically, the WAP 110 may include built-in security to only allow authorized devices to connect to the WAP 110. For example, a security key (or password) may be required to connect to the WAP 110. The device 140 may acquire the security key required to connect to the WAP 110 from a configuration sheet 120. After acquiring the security key from the configuration sheet 120, the device 140 may supply the security key to the WAP 110 in order to gain access to the network 130.

In an embodiment, the device 140 may acquire the security key required to connect to the WAP 110 by capturing one or more images 122 from the configuration sheet 120. The image 122 may encode the security key based on a predetermined protocol. In an embodiment, the protocol may be a standardized protocol. For example, image 122 may be a Quick Response Code (QR Code), which is a type of matrix bar code with a large storage capacity. A standard QR Code can encode up to 7,089 characters of numeric data, up to 4,296 alphanumeric characters of data, or up to 2,953 8-bit bytes of data.

In an embodiment, based on the predetermined protocol, the device 140 may include component(s) to capture and decode the coded information (i.e., the security key) in image 122. In a further embodiment, the captured coded information may be transferred to a component which decodes the coded information to obtain the security key. In an embodiment, the component capturing the coded information and the component decoding the coded information may be a single component. In an embodiment, the component(s) capturing/decoding the coded information may include hardware, software, or a combination of both hardware and software. For example, device 140 may be a mobile phone. The mobile phone 140 may capture image 122 via a built-in camera. An application installed in mobile phone 140 may then retrieve the coded information from the captured image 122 and decode the coded information to obtain the security key required for connecting to WAP 110.

In an example embodiment, WAP 110 may initially be protected by a default security key selected by the manufacturer or seller of the WAP 110. The format of the default security key may depend on the security protocols available on WAP 110. For example, the WAP 110 may employ Wi-Fi Protected Access II (WPA2) as the security protocol. Since a WPA2 security key may be long and hard to remember, the manufacturer may include a configuration sheet 120 to provide convenient and secure access to WAP 110. The configuration sheet 120 may include an image 122, which is a coded representation of the initial default security key. For example, the configuration sheet 120 may include a QR Code representing the security key. In an embodiment, the image 122 may be printed on the WAP 110 itself. The user of WAP 110 may scan/capture the QR Code 122 using a device 140 such as a mobile phone. Device 140 may decode QR Code 122 to obtain the security key and connect to WAP 110.

In an example embodiment, access to WAP 110 may be a service that a seller desires to selectively provide to paying customers. In another embodiment, access to WAP 110 may be a service that a seller desires to provide to customers who purchase another product. For example, it is common for coffee shops to provide wireless Internet access (through WAP 110) to individuals who are within the vicinity of the coffee shop. The coffee shop may want to selectively limit the Internet access to customers who purchase a product, such as a coffee, from the coffee shop. In an embodiment, the coffee shop may do so by password protecting the WAP 110 of the coffee shop, and providing the password through an image 122, such as a QR Code, printed on the receipt (a type of configuration sheet 120) of each coffee purchase. In another embodiment, the QR Code 122 may be printed on any material bundled with the coffee including the coffee cup, the coffee cup insulator, etc.

Figure 2:
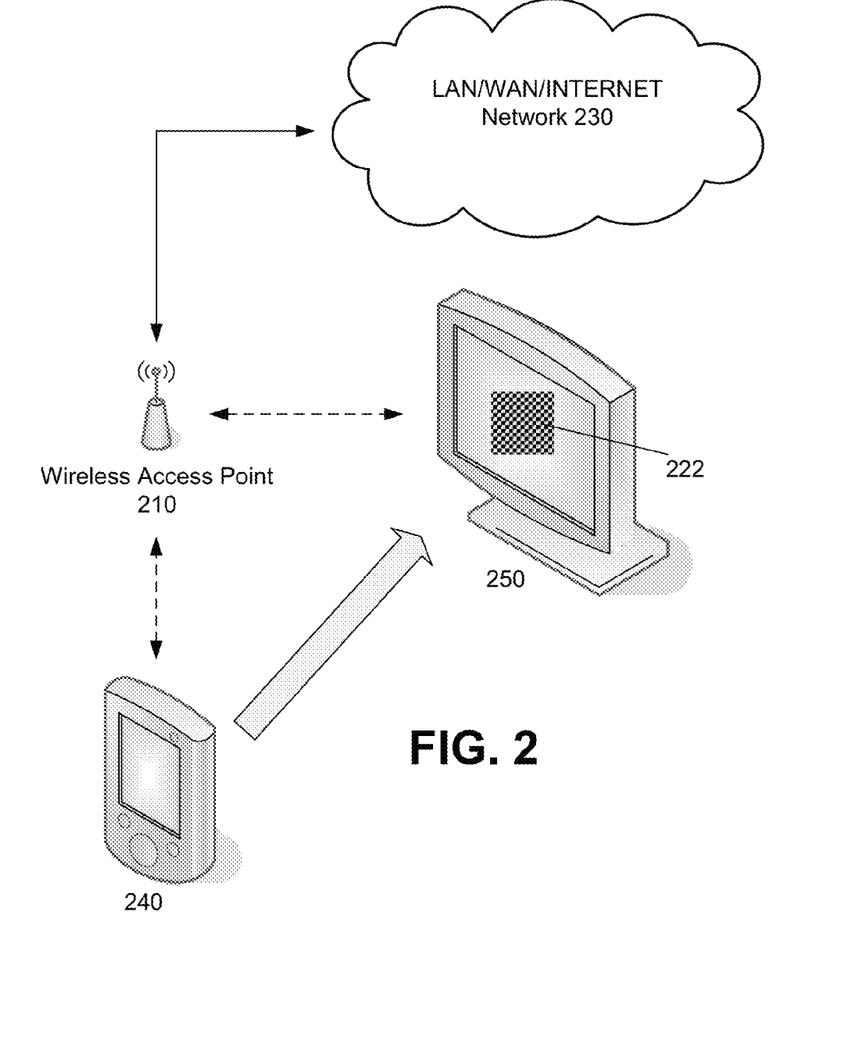
FIG. 2 illustrates a device connected to a WAP according to an embodiment.

FIG. 2 illustrates a device connected to a WAP according to an embodiment. A WAP 210 may be connected to a network 230 such as a WAN, LAN, or the Internet. A first device 240 may connect to the WAP 210 to access the network 230. Typically, the WAP 210 may include built-in security to only allow authorized devices to connect to the WAP 210. For example, a security key (or password) may be required to connect to the WAP 210. In an embodiment, a second device 250 may have access to the security key needed to connect to WAP 210. The first device 240 may acquire the security key required to connect to the WAP 210 from the second device 250. After acquiring the security key from the second device 250, the first device 240 may supply the security key to the WAP 210 in order to gain access to the network 230.

In an embodiment, the first device 240 may capture coded information 222 from the second device 250, and decode the coded information 222 to obtain the security key required to connect to the WAP 210. The coded information 222 may be an image(s), audio, and/or video. The coded information 222 may convey the security key based on a predetermined protocol. In an embodiment, the protocol may be a standardized protocol. For example, coded information 222 may be a QR Code.

In an embodiment, the first device 240 may include component(s) to capture and decode the coded information 222 (i.e., the security key). The component(s) may vary based on the coded information 222. In an example embodiment, the coded information 222 may be an image such as a QR Code displayed on, for example, a monitor of the second device 250. The first device 240 may capture image 222 via a built-in camera. An application installed in mobile phone 240 may then retrieve the coded information from the captured image 222 and decode the coded information to obtain the security key required for connecting to WAP 210.

In an example embodiment, the coded information 222 may be an audio clip which may be played, for example, through audio speakers of the second device 250. The first device 240 may capture the audio 222 via a built-in microphone. The first device 240 may then retrieve the coded information from the captured audio 222 and decode the coded information to obtain the security key.

In an example embodiment, the coded information 222 may be a video which may be displayed, for example, on a monitor of second device 250. The first device 240 may capture the video 222 via a built-in video camera. The first device 240 may then retrieve the coded information from the captured video 222 and decode the coded information to obtain the security key.

In an embodiment, the second device 250 may be connected to the WAP 210 via a wireline or wireless connection. The settings of WAP 210 may be configured through the second device 250. For example, the security key required to connect to WAP 210 may be changed using the second device 250. In an embodiment, the second device 250 may automatically generate coded information 222 representing the current security key to WAP 210 when the security key of WAP 210 is changed. The second device may display (if the coded information is an image or video) or play (if the coded information is audio) the coded information. For example, an application running on device 250 may display/play the coded information 222 when a user interacts with the application and indicates that he/she requires the coded information 222. In an embodiment, the second device 250 may require authentication to display/play the coded information 222.

Figure 4:
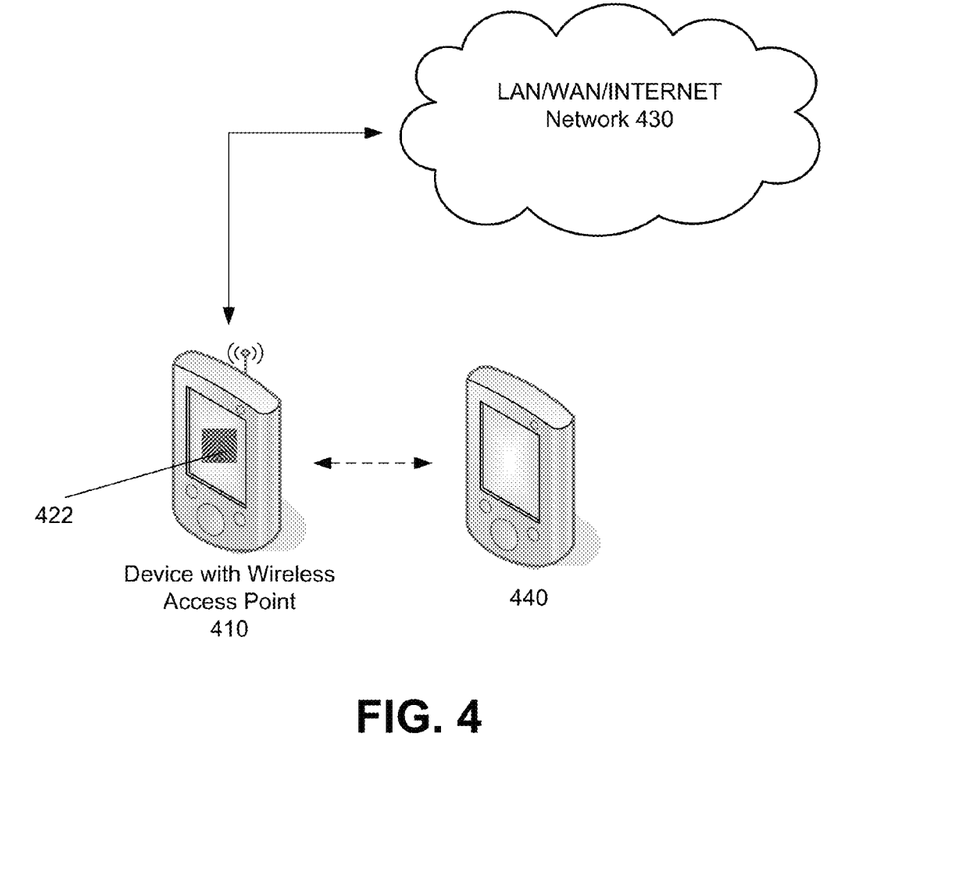
FIG. 4 illustrates a device connected to a WAP according to an embodiment.

In an embodiment, the WAP 210 and the second device 250 may be integrated as shown in FIG. 4 (the device with a WAP 410). For example, the device with WAP 410 may be a mobile phone with tethering capabilities. Device 440 may connect to the device with WAP 410 to access the network 430. The device with WAP 410 may include built-in security to only allow authorized devices to connect to the device with WAP 410. In an embodiment, the device 440 may acquire the security key required to connect to the device with WAP 410 from the device with WAP 410 itself. This may be accomplished through coded information 422, which the device 440 may decode to obtain the security key. The device 440 may then supply the security key to the device with WAP 410 in order to gain access to the network 230. The details of capturing the coded information 422, decoding the information, and connecting to the WAP of device 410 have been previously explained in the discussion pertaining to FIG. 2.

Figure 3:
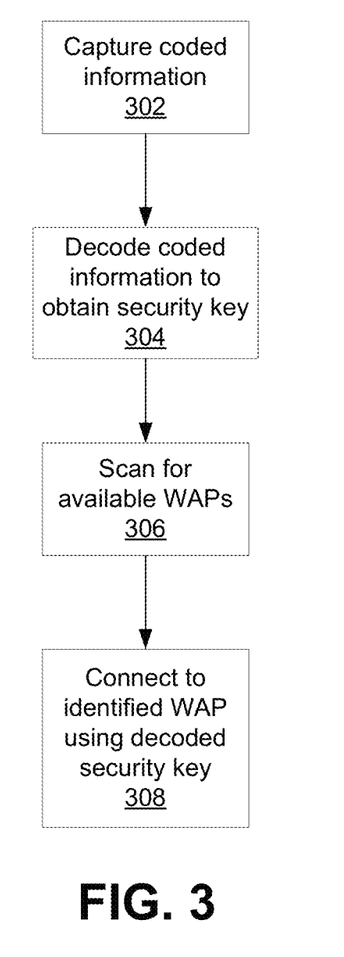
FIG. 3 is a flow diagram illustrating a process for connecting to a WAP according to an embodiment.

FIG. 3 is a flow diagram illustrating a process for connecting to a WAP according to an embodiment. A device, such as a mobile phone, may capture coded information which includes a security key to connect to a particular WAP (box 302). As explained with respect to FIGS. 1 and 2, there are different sources from which the coded information may be captured (for example, from a configuration sheet or another device). The coded information may be decoded by the device to obtain the security key required for connecting to the particular WAP (box 304). The device may scan for available WAPs visible to the device (box 306). Once the particular WAP to connect to is identified, the device may connect to the particular WAP (box 308).

In an embodiment, in addition to the security key, the coded information may further include an identifier indicating the particular WAP so that the user does not have to manually enter (or remember) the name of the WAP. Therefore, the device connecting to the WAP may automatically do so without much manual intervention (i.e., the user may not have to indicate to the device which WAP he/she is trying to connect to). Thus, in an embodiment, step 306 may be skipped. Including the identifier indicating the particular WAP may also be useful in instances where the particular WAP is hidden. Specifically, a hidden WAP cannot be seen by scanning for all available WAPs in the vicinity, but rather the device needs to know the exact identifier of the WAP, such as the name of the WAP, in order to connect to it.

In an embodiment, some of the steps in FIG. 3 may be manually initiated by a user. For example, the device may display the decoded security key to the user, and the user may have to copy and paste the decoded security key to another application in the device which interfaces with the WAP. In an embodiment, the user may have to initiate scanning for WAPs on the device to identify the available WAPs and pick the particular WAP which the user wants the device to connect to.

In an embodiment, the steps shown in FIG. 3 may be performed in a different order and/or some steps may be performed in parallel. For example, in an embodiment, decoding the coded information to obtain the security key (box 304) may be performed in parallel with scanning for available WAPs (box 306). Similarly, in an embodiment, scanning for available WAPs (box 306) may be performed prior to capturing the coded information (box 302).

In an embodiment, WAPs may incorporate any type of wireless security protocol including Wi-Fi Protected Access (WPA), Wi-Fi Protected Access II (WPA2), and Wired Equivalent Privacy (WEP).

Figure 5:
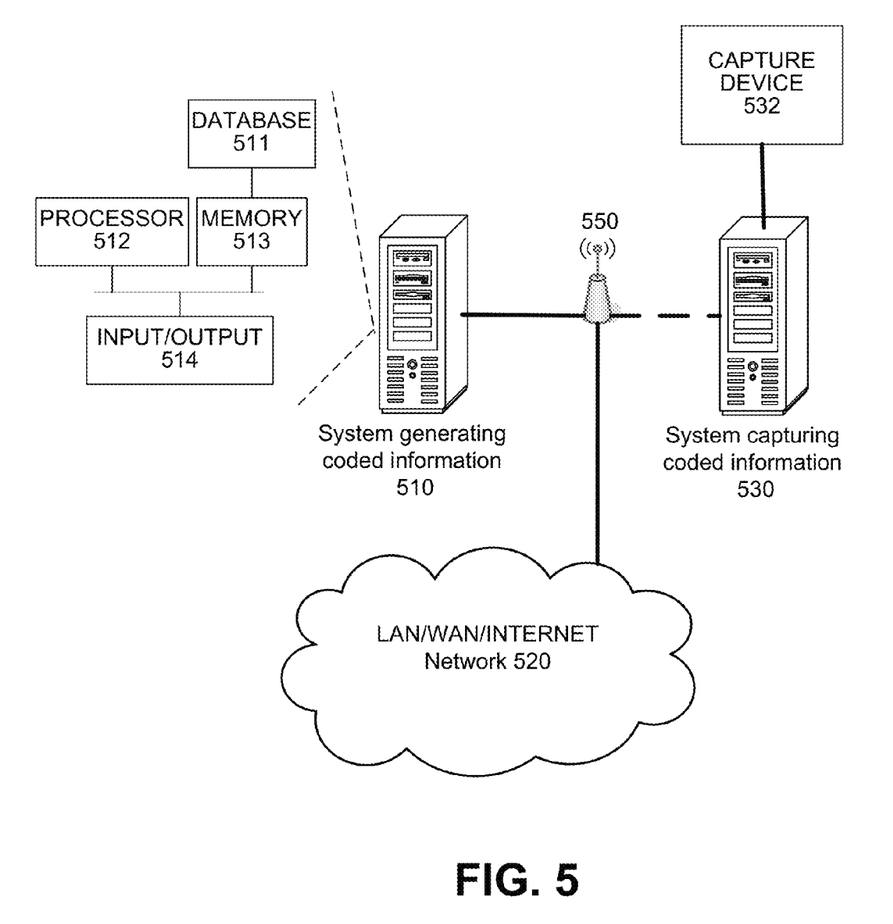
FIG. 5 shows an exemplary architecture in an embodiment.

FIG. 5 shows an exemplary architecture in an embodiment of the invention. The system generating coded information 510 may be coupled to a network 520 and to WAP 550. The system generating coded information 510 may include a desktop computer, laptop computer, tablet PC, client computer, mobile phone, central computer in a vehicle, and any other computer.

A system capturing coded information 530 may include a capture device 532 to capture the coded information. The capture device 532 may include a still camera, a video camera, a barcode scanner, and/or a microphone. The system capturing coded information 530 may include hardware and/or software to capture and/or decode coded information.

Each of the systems 510, 530 in FIG. 5 may include a processing device 512, memory 513, a database 511, and an input/output interface 514, all of which may be interconnected via a system bus. The output interface 514 may include a computer monitor, a tablet PC screen, a mobile phone screen, and any other displays. In various embodiments, each of the systems 510, 530 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory 513 may contain different components for retrieving, presenting, changing, and saving data. Memory 513 may include a variety of memory devices, for example, Dynamic Random Access Memory (DRAM), Static RAM (SRAM), flash memory, cache memory, and other memory devices. Additionally, for example, memory 513 and processing device(s) 512 may be distributed across several different computers that collectively comprise a system.

Database 511 may include any type of data storage adapted to searching and retrieval. The database 511 may include SAP database (SAP DB), Informix, Oracle, DB2, Sybase, and other such database systems.

Processing device 512 may perform computation and control functions of a system and comprises a suitable central processing unit (CPU). Processing device 512 may comprise a single integrated circuit, such as a microprocessing device, or may comprise any suitable number of integrated circuit devices and/or circuit boards working in cooperation to accomplish the functions of a processing device. Processing device 512 may execute computer programs, such as object-oriented computer programs, within memory 513.

In FIGS. 1-5 devices are illustrated as smart phones and desktop computers for discussion purposes, but a person having ordinary skill in the art will appreciate that the principles of the present invention are not so limited. Embodiments of the present invention find application with devices including personal computers (both desktop and laptop computers), tablet computers, handheld computing devices, computer servers, media players, e-book readers, and/or dedicated video conferencing equipment.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

I claim:

1. A computer-implemented method to connect a first electronic device wirelessly to a network comprising:
    capturing coded information, with the first electronic device, from a display of a second electronic device, wherein a wireless access point of the network is integrated with the second electronic device, the coded information includes a security key to connect the first electronic device to the wireless access point, and the coded information is an image;
    decoding the coded information with the first electronic device to obtain the security key;
    supplying the security key through a wireless connection between the first electronic device and the wireless access point integrated with the second electronic device; and
    connecting the first electronic device to the network through the wireless access point integrated with the second electronic device based on both the supplied security key and the first electronic device being an authorized device of the wireless access point, wherein the first electronic device connects to the wireless access point integrated with the second electronic device exclusively through the connection based on both the supplied security key and the first electronic device being an authorized device of the wireless access point,
    wherein the coded information includes an identifier identifying the wireless access point and wherein the wireless access point is hidden.

2. The method of claim 1, wherein the coded information is a QR code.

3. The method of claim 1, wherein the coded information is captured from a configuration sheet.

4. The method of claim 1, wherein the wireless access point is secured by one of Wi-Fi Protected Access, Wi-Fi Protected Access II, and Wired Equivalent Privacy.

5. The method of claim 1, wherein the first electronic device is a mobile phone.

6. An apparatus comprising:
    a camera to capture coded information from a display of an electronic device, wherein a wireless access point of a network is integrated with the electronic device, the coded information includes a security key to connect the apparatus to the wireless access point, and the coded information is an image:
    a processor for executing computer instructions, the processor configured to:
        decode the coded information to obtain the security key, supply the security key through a wireless connection between the apparatus and the wireless access point integrated with the electronic device; and connect the apparatus to the network through the wireless access point integrated with the electronic device based on both the supplied security key and the apparatus being an authorized device of the wireless access point, wherein the apparatus connects to the wireless access point integrated with the second electronic device exclusively through the connection based on both the supplied security key and the apparatus being an authorized device of the wireless access point, wherein the coded information includes an identifier identifying the wireless access point and wherein the wireless access point is hidden.

7. The apparatus of claim 6, where in the coded information is a QR code.

8. The apparatus of claim 6, wherein the wireless access point is secured by one of Wi-Fi Protected Access, Wi-Fi Protected Access II, and Wired Equivalent Protection Privacy.

9. The apparatus of claim 6, wherein the first electronic device is a mobile phone.

10. A non-transitory computer-readable medium embodied with computer-executable instructions for causing a computer to execute instructions, the computer instructions comprising:

capturing coded information, with a first electronic device, from a display of a second electronic device, wherein a wireless access point of a network is integrated with the second electronic device, the coded information includes a security key to connect the first electronic device to the wireless access point, and the coded information is an image;

decoding the coded information with the first electronic device to obtain the security key;

supplying the security key through a wireless connection between the first electronic device and the wireless access point integrated with the second electronic device; and connecting the first electronic device to the network through the wireless access point integrated with the second electronic device based on both the supplied security key and the first electronic device being an authorized device of the wireless access point, wherein the first electronic device connects to the wireless access point integrated with the second electronic device exclusively through the connection based on both the supplied security key and the first electronic device being an authorized device of the wireless access point, wherein the coded information includes an identifier identifying the wireless access point and wherein the wireless access point is hidden.

11. The computer-readable medium of claim 10, wherein the coded information is a QR code.

12. The computer-readable medium of claim 10, wherein the first electronic device is a mobile phone.

13. A computer-implemented method to connect an electronic device wirelessly to a network comprising:

capturing coded information with the electronic device, wherein the coded information includes a security key to connect the electronic device to a wireless access point of the network, and the coded information is an audio clip;

decoding the coded information with the electronic device to obtain the security key;

supplying the security key through a wireless connection between the electronic device and the wireless access point; and connecting the electronic device to the network through the wireless access point based on both the supplied security key and the first electronic device being an authorized device of the wireless access point, wherein the first electronic device connects to the wireless access point integrated with the second electronic device exclusively through the connection based on both the supplied security key and the first electronic device being an authorized device of the wireless access point, wherein the coded information includes an identifier identifying the wireless access point and wherein the wireless access point is hidden.

14. A computer-implemented method to connect an electronic device wirelessly to a network comprising:

capturing coded information with the electronic device, wherein the coded information includes a security key to connect the electronic device to a wireless access point of the network, and the coded information is a video;

decoding the coded information with the electronic device to obtain the security key;

supplying the security key through a wireless connection between the electronic device and the wireless access point; and connecting the first electronic device to the network through the wireless access point based on both the supplied security key and the first electronic device being an authorized device of the wireless access point, wherein the first electronic device connects to the wireless access point integrated with the second electronic device exclusively through the connection based on both the supplied security key and the first electronic device being an authorized device of the wireless access point, wherein the coded information includes an identifier identifying the wireless access point and wherein the wireless access point is hidden.

* * * * *